US010762603B2

(12) United States Patent
Zabic et al.

(10) Patent No.: US 10,762,603 B2
(45) Date of Patent: Sep. 1, 2020

(54) SYSTEM AND METHOD FOR IMAGE DENOISING

(71) Applicant: SHANGHAI UNITED IMAGING HEALTHCARE CO., LTD., Shanghai (CN)

(72) Inventors: Stanislav Zabic, Houston, TX (US); Zhicong Yu, Houston, TX (US)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 152 days.

(21) Appl. No.: 15/599,558

(22) Filed: May 19, 2017

(65) Prior Publication Data

US 2018/0336663 A1    Nov. 22, 2018

(51) Int. Cl.
| | |
|---|---|
| *G06K 9/00* | (2006.01) |
| *G06K 9/40* | (2006.01) |
| *H04N 5/228* | (2006.01) |
| *G06T 5/00* | (2006.01) |
| *G06T 11/00* | (2006.01) |
| *H04N 9/04* | (2006.01) |
| *H04N 9/64* | (2006.01) |

(52) U.S. Cl.
CPC .......... *G06T 5/002* (2013.01); *G06K 9/40* (2013.01); *G06T 11/006* (2013.01); *H04N 9/04* (2013.01); *H04N 9/646* (2013.01); *G06T 2207/10081* (2013.01); *G06T 2207/20192* (2013.01); *G06T 2211/424* (2013.01)

(58) Field of Classification Search
USPC .................................... 382/254; 348/222.1
See application file for complete search history.

(56) References Cited

U.S. PATENT DOCUMENTS

| | | | |
|---|---|---|---|
| 6,608,942 B1 | 8/2003 | Le | |
| 9,305,337 B2 * | 4/2016 | Adams | .................... G06T 3/403 |
| 2008/0175457 A1 | 7/2008 | Watson | |
| 2011/0044524 A1 | 2/2011 | Wang et al. | |
| 2013/0107072 A1 * | 5/2013 | Kumar | ................. H04N 5/2258 348/222.1 |
| 2014/0140636 A1 | 5/2014 | Jiang et al. | |
| 2014/0201126 A1 | 7/2014 | Zadeh et al. | |
| 2014/0355856 A1 * | 12/2014 | Wang | ................. G01B 9/02091 382/131 |

(Continued)

FOREIGN PATENT DOCUMENTS

CN    103439163 A    1/2014

OTHER PUBLICATIONS

European Search Report for European application No. 17178719.5 dated Nov. 24, 2017, 8 pages.

(Continued)

*Primary Examiner* — Kathleen Y Dulaney
(74) *Attorney, Agent, or Firm* — Metis IP LLC

(57) ABSTRACT

Systems and methods for image noise reduction are provided. The methods may include obtaining first image data, determining a restriction or a gradient of the first image data, determining a regularization parameter for the first image data based on the restriction or the gradient, generating second image data based on the regularization parameter and the first image data, and generating a regularized image based on the second image data.

20 Claims, 12 Drawing Sheets

(56) References Cited

U.S. PATENT DOCUMENTS

2016/0071245 A1* 3/2016 Bergner ............... G06T 11/003
                                                    382/131
2016/0140725 A1   5/2016 Bergner et al.
2017/0186194 A1*  6/2017 Koehler ............... A61B 6/5282
2018/0293711 A1* 10/2018 Vogels .................... G06F 17/10
2018/0336678 A1  11/2018 Yu et al.

OTHER PUBLICATIONS

Yu Wei et al: "Edge-preserving reconstruction from sparse projections of limited-angle computed tomography using 10-regularized gradient prior," Review of Scientific Instruments, AIP, Melville, NY, US, vol. 88, No. 4, Apr. 24, 2017 (Apr. 24, 2017).

Markus Grasmair and Frank Lenzen, "Anisotropic Total Variation Filtering," Applied Mathematics & Optimization, 2010, 62(3): 323-339.

Antoni Buades et al., "A Non-Local Algorithm for Image Denoising," IEEE Computer Society Conference on Computer Vision and Pattern Recognition, Jun. 20-25, 2005.

C. Tomasi and R. Manduchi, "Bilateral Filtering for Gray and Color Images," Sixth International Conference on Computer Vision, Jan. 7-7, 1998.

Joachim Weickert, Anisotropic Diffusion in Image Processing, B.G. teubner Stuttgart, 16(1):272, 1996.

\* cited by examiner

SYSTEM AND METHOD FOR IMAGE DENOISING

TECHNICAL FIELD

The present disclosure generally relates to image denoising, and more particularly to a system and method for image noise reduction, as a part of regularized statistical reconstruction in computed tomography.

BACKGROUND

Computed tomography (CT) is a technology that makes use of computer-processed combinations of X-ray images taken from different angles to produce cross-sectional images. The CT technology has been widely used in medical diagnosis. During the process of a CT scanning, noise(s) may appear in the reconstructed images. Noise(s) in uniform regions may be reduced or suppressed by performing an image denoising operation, for example, an edge preserving regularization. However, the edge preserving regularization may not reduce noise(s) on boundaries between uniform regions, making the area on the boundary between smooth surfaces appear to be rough. Thus, there is a need for a system and method to reduce the noise(s) around edges in a reconstructed image.

SUMMARY

In some aspects of the present disclosure, a system and a method for image noise reduction is provided. The system may include a processor and storage. The storage may store instructions. The instructions, when executed by the processor, may cause the processor to perform the method. The method may include one or more of the following operations. First image data may be obtained. A restriction or a gradient of the first image data may be determined. A regularization parameter for the first image data may be determined based on the restriction or the gradient. Second image data may be generated based on the regularization parameter and the first image data. A regularized image may be determined based on the second image data.

In some embodiments, the first image data may be obtained by reconstructing original projection data with a statistical reconstruction technique with edge preserving regularization In some embodiments, the restriction of the first image data may be determined based on a regularization item.

In some embodiments, the regularization item may be a matrix including one or more item elements corresponding to one or more pixels or voxels of the first image data.

In some embodiments, the gradient of the first image data may be determined based the grey values of the first image data In some embodiments, the gradient may be a matrix including one or more gradient values corresponding to one or more pixels or voxels of the first image data.

In some embodiments, the second image data may be generated based on the regularization parameter by regularizing the first image data in a plurality of iterations. During each of the plurality of iterations, one or more of the following operations may be performed. The restriction or the gradient of the image data generated in the prior iteration may be determined. The regularization parameter may be updated based on the restriction or the gradient. The image data obtained in the prior iteration may be modified based on the regularization parameter and the image data.

In another aspect of the present disclosure, a system for image noise reduction is provided. The system may include an image generating module, a regularization unit and an image reconstruction unit. The image generating module may be configured to obtain first image data. The regularization unit may be configured to determine a restriction or a gradient of the first image data and determine a regularization parameter for the first image data based on the restriction or the gradient. The image reconstruction unit may be configured to reconstruct second image data based on the regularization parameter.

In a further aspect of the present disclosure, a non-transitory computer readable medium is provided. The non-transitory computer readable medium storing instructions, the instructions, when executed by a computer, may cause the computer to implement a method. The method may include one or more of the following operations. First image data may be obtained. A restriction or a gradient of the first image data may be determined. A regularization parameter for the first image data may be determined based on the restriction or the gradient. Second image data may be generated based on the regularization parameter and the first image data. A regularized image may be determined based on the second image data.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 2:
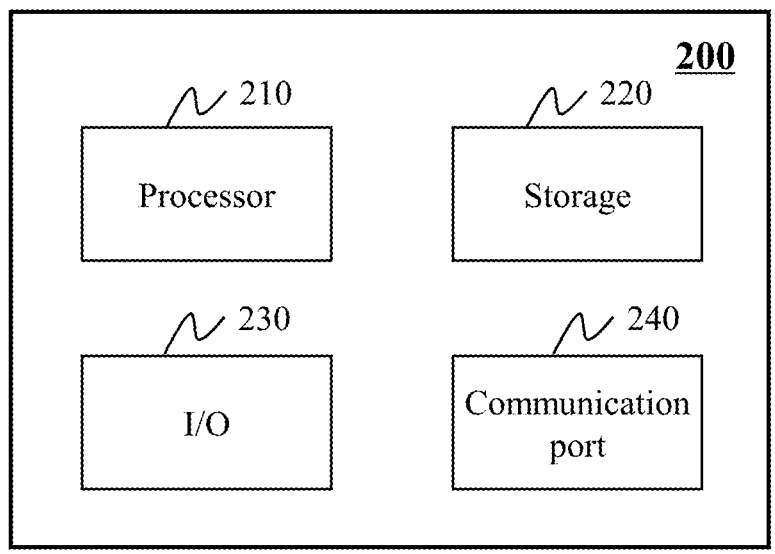
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for non-invasive imaging, such as for disease diagnosis or research purposes. In some embodiments, the imaging system may be a computed tomography (CT) system, an emission computed tomography (ECT) system, a magnetic resonance imaging (MRI) system, an ultrasonography system, an X-ray photography system, a positron emission tomography (PET) system, or the like, or any combination thereof.

For illustration purposes, the disclosure describes systems and methods for CT image reconstruction. The system may reconstruct a CT image based on a statistical image reconstruction algorithm. The statistical image reconstruction algorithm may include a regularization parameter that may be used to reduce noise or artifacts during the statistical image reconstruction.

The following description is provided to help better understanding CT image reconstruction methods and/or systems. The term "image" used in this disclosure may refer to a 2D image, a 3D image, a 4D image, and/or any related image data (e.g., CT data, projection data corresponding to the CT data). This is not intended to limit the scope the present disclosure. For persons having ordinary skills in the art, a certain amount of variations, changes, and/or modifications may be deducted under the guidance of the present disclosure. Those variations, changes, and/or modifications do not depart from the scope of the present disclosure.

Figure 1A:
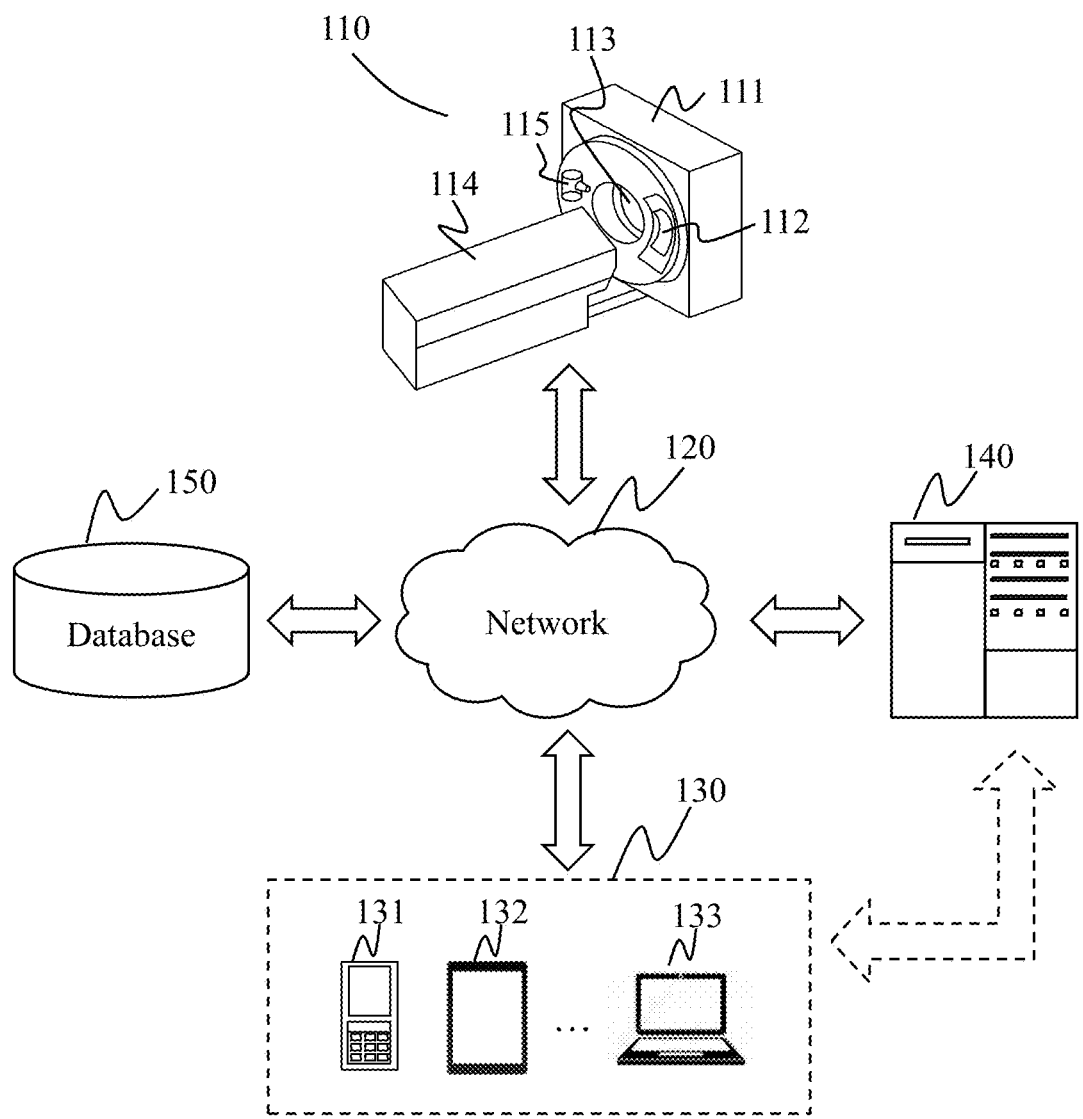
FIG. 1A and FIG. 1B are schematic diagrams illustrating an exemplary CT system according to some embodiments of the present disclosure.
Figure 1B:
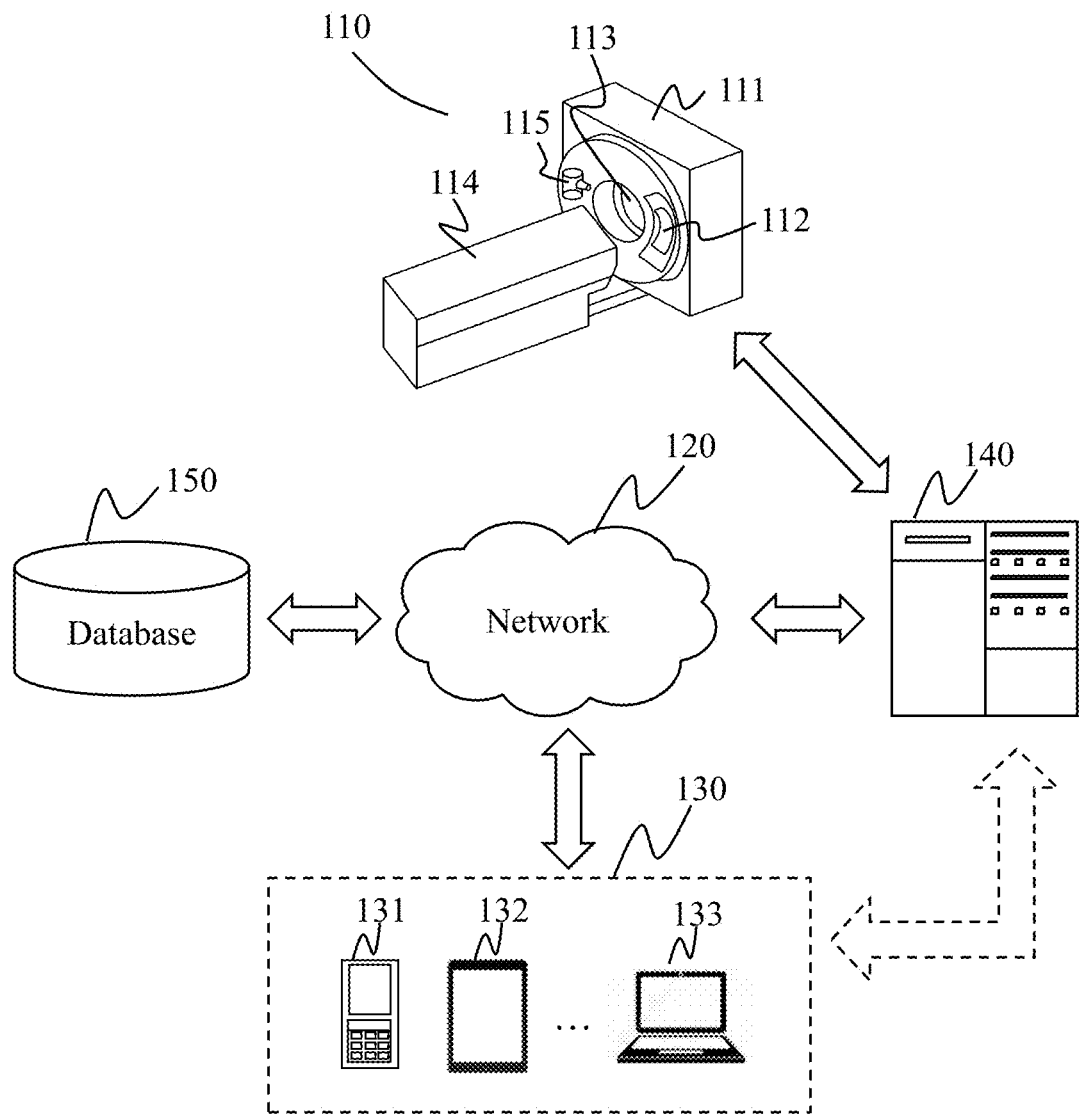

FIGS. 1A and 1B are schematic diagrams illustrating an exemplary CT system 100 according to some embodiments of the present disclosure. As shown, the CT system 100 may include a CT scanner 110, a network 120, one or more terminals 130, a processing engine 140, and a database 150.

The CT scanner 110 may include a gantry 111, a detector 112, a detecting region 113, a table 114, and a radioactive scanning source 115. The gantry 111 may support the detector 112 and the radioactive scanning source 115. A subject may be placed on the table 114 for scanning. The radioactive scanning source 115 may emit radioactive rays to the subject. The detector 112 may detect radiation events (e.g., gamma photons) emitted from the detecting region 113. In some embodiments, the detector 112 may include one or more detector units. The detector units may include a scintillation detector (e.g., a cesium iodide detector), a gas detector, etc. The detector unit may be and/or include a single-row detector and/or a multi-rows detector.

The network 120 may include any suitable network that can facilitate exchange of information and/or data for the CT system 100. In some embodiments, one or more components of the CT system 100 (e.g., the CT scanner 110, the terminal 130, the processing engine 140, the database 150, etc.) may communicate information and/or data with one or more other components of the CT system 100 via the network 120. For example, the processing engine 140 may obtain image data from the CT scanner 110 via the network 120. As another example, the processing engine 140 may obtain user instructions from the terminal 130 via the network 120. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, witches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the CT system 100 may be connected to the network 120 to exchange data and/or information.

The terminal(s) 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™ etc. In some embodiments, the terminal(s) 130 may be part of the processing engine 140.

The processing engine 140 may process data and/or information obtained from the CT scanner 110, the terminal 130, and/or the database 150. For example, the processing engine 140 may process image data and determine a regularization item that may be used to modify the image data. In some embodiments, the processing engine 140 may be a computer, a user console, a single server or a server group, etc. The server group may be centralized or distributed. In some embodiments, the processing engine 140 may be local or remote. For example, the processing engine 140 may access information and/or data stored in the CT scanner 110, the terminal 130, and/or the database 150 via the network 120. As another example, the processing engine 140 may be directly connected to the CT scanner 110, the terminal 130 and/or the database 150 to access stored information and/or data. In some embodiments, the processing engine 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing engine 140 may be implemented by a computing device 200 having one or more components as illustrated in FIG. 2.

The database 150 may store data, instructions, and/or any other information. In some embodiments, the database 150 may store data obtained from the terminal 130 and/or the processing engine 140. In some embodiments, the database 150 may store data and/or instructions that the processing engine 140 may execute or use to perform exemplary methods described in the present disclosure. In some embodiments, the database 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 150 may be connected to the network 120 to communicate with one or more other components in the CT system 100 (e.g., the processing engine 140, the terminal 130, etc.). One or more components in the CT system 100 may access the data or instructions stored in the database 150 via the network 120. In some embodiments, the database 150 may be directly connected to or communicate with one or more other components in the CT system 100 (e.g., the processing engine 140, the terminal 130, etc.). In some embodiments, the database 150 may be part of the processing engine 140.

FIG. 2 is a schematic diagram illustrating exemplary hardware and/or software components of an exemplary computing device 200 on which the processing engine 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing engine 140 in accordance with techniques described herein. The computer instructions may include, for example, routines, programs, objects, components, data structures, procedures, modules, and functions, which perform particular functions described herein. For example, the processor 210 may process image data obtained from the CT scanner 110, the terminal 130, the database 150, and/or any other component of the CT system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the CT scanner 110, the terminal 130, the database 150, and/or any other component of the CT system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 140 for determining a regularization item.

The I/O 230 may input and/or output signals, data, information, etc. In some embodiments, the I/O 230 may enable a user interaction with the processing engine 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 140 and the CT scanner 110, the terminal 130, and/or the database 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
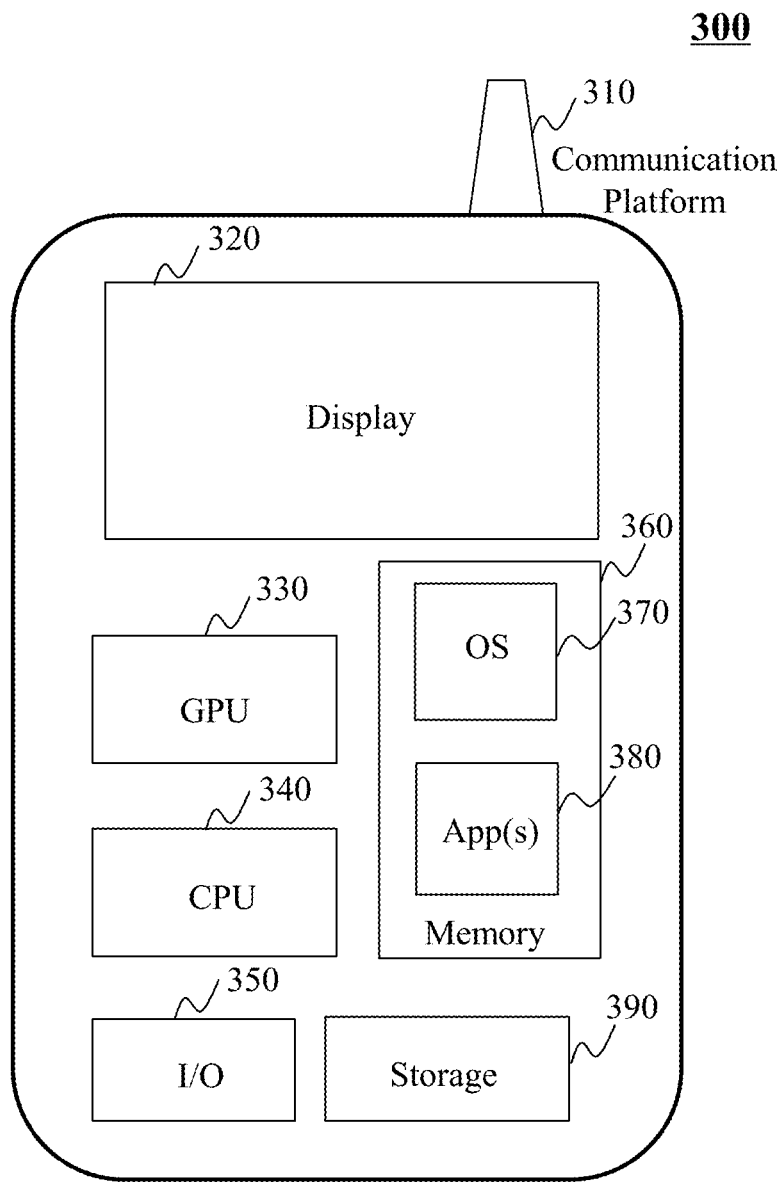
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 140. User interactions with the information stream may be achieved via the I/O 350 and provided to the processing engine 140 and/or other components of the CT system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
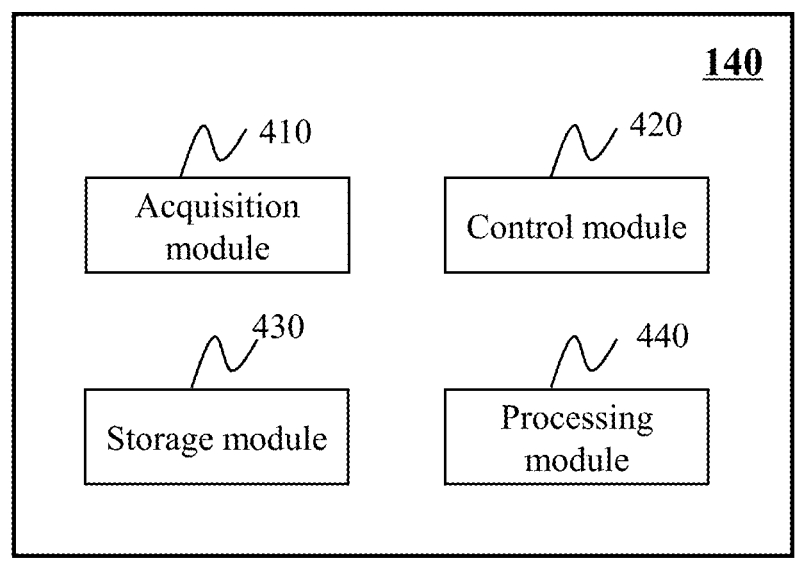
FIG. 4 is a block diagram illustrating an exemplary processing engine according to some embodiments of the present disclosure.

FIG. 4 is a block diagram illustrating an exemplary processing engine 140 according to some embodiments of the present disclosure. The processing engine 140 may include an acquisition module 410, a control module 420, a storage module 430, and a processing module 440.

The acquisition module 410 may acquire CT data. The acquisition module 410 may acquire the CT data from the detector 112. The CT data may be associated with X-rays that pass through a subject. In some embodiments, the radioactive scanning source 115 may emit the X-rays to the subject. The X-rays may pass through the subject and may attenuate during the passing process. The attenuated X-rays may be detected by the detector 112 and transmitted to the acquisition module 410. In some embodiments, the acquired CT data may be transmitted to the storage module 430 to be stored.

The control module 420 may control operations of the acquisition module 410, the storage module 430, and/or the processing module 440 (e.g., by generating one or more control parameters). For example, the control module 420 may control the acquisition module 410 to acquire a signal, the timing of the acquisition of the signal, etc. As another example, the control module 420 may control the processing module 440 to process the CT data acquired by the acquisition module 410. In some embodiments, the control module 420 may receive a real-time command or retrieve a predetermined command provided by a user (e.g., a doctor) to control one or more operations of the acquisition module 410 and/or the processing module 440. For example, the control module 420 can adjust the acquisition module 410 and/or the processing module 440 to generate images of a subject according to the real-time command and/or the predetermined command. In some embodiments, the control module 420 may communicate with one or more other modules of the processing engine 140 for exchanging information and/or data.

The storage module 430 may store CT data, control parameters, processed CT data, or the like, or a combination thereof. In some embodiments, the storage 430 may store one or more programs and/or instructions that may be executed by the processor(s) of the processing engine 140 to perform exemplary methods described in this disclosure. For example, the storage 430 may store program(s) and/or instruction(s) that can be executed by the processor(s) of the processing engine 140 to acquire CT data, reconstruct a CT image based on the CT data, and/or display any intermediate result or a resultant image.

The processing module 440 may process information provided by various modules of the processing engine 140. The processing module 440 may process CT data acquired by the acquisition module 410, CT data retrieved from the storage module 430, etc. In some embodiments, the processing module 440 may reconstruct CT images based on the CT data according to a reconstruction algorithm, generate reports including one or more CT images and/or other related information, and/or perform any other function for image reconstruction in accordance with various embodiments of the present disclosure. Exemplary reconstruction algorithm may include an iterative reconstruction algorithm (e.g., a statistical reconstruction algorithm), a Fourier slice theorem algorithm, a filtered back projection (FBP) algorithm, a fan-beam reconstruction algorithm, an analytic reconstruction algorithm, or the like, or any combination thereof. For example, the processing module 440 may determine a regularization item and/or a regularization parameter for the CT data and reconstruct a CT image based on the regularization item and/or the regularization parameter.

In some embodiments, one or more modules illustrated in FIG. 4 may be implemented in at least part of the exemplary CT system as illustrated in FIGS. 1A and 1B. For example, the acquisition module 410, the control module 420, the storage module 430, and/or the processing module 440 may be integrated into a console (not shown). Via the console, a user may set parameters for scanning an object, controlling imaging processes, controlling parameters for reconstruction of an image, viewing reconstructed images, etc. In some embodiments, the console may be implemented via the processing engine 140 and/or the terminal 130.

Figure 5:
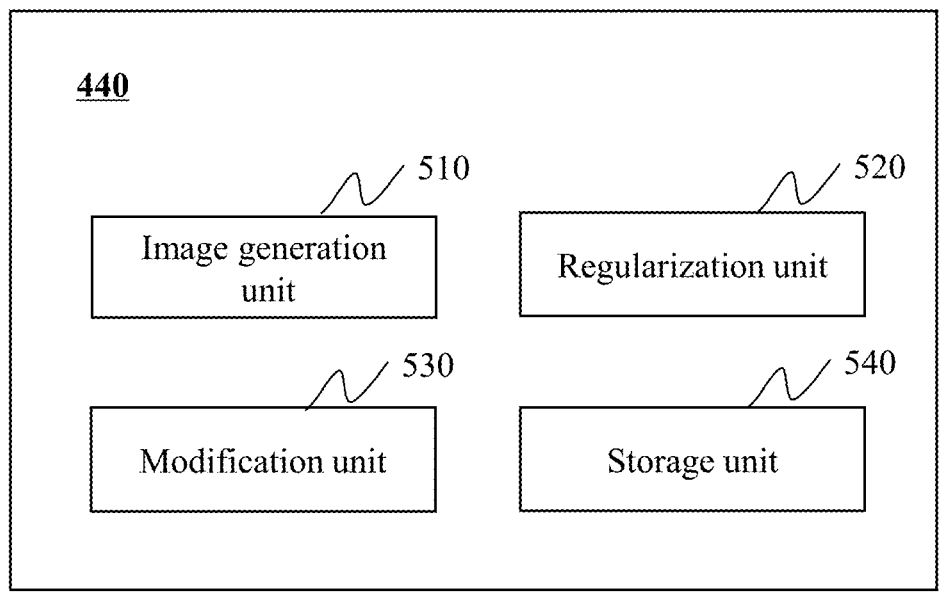
FIG. 5 is a block diagram illustrating an exemplary processing module according to some embodiments of the present disclosure.

FIG. 5 is a block diagram illustrating an exemplary processing module 440 according to some embodiments of the present disclosure. The processing module 440 may include an image generation unit 510, a regularization unit 520, a modification unit 530, and a storage unit 540. The processing module 440 may be implemented on various components (e.g., the processor 210 of the computing device 200 as illustrated in FIG. 2).

The image generation unit 510 may generate or update image data (or an image corresponding to the image data). It should be noted that in this disclosure, the terms "image" and "image data" may be used interchangeably. The image data may include 2D image data, 3D image data, 4D image data, or the like, or a combination thereof. The image corresponding to the image data may include a 2D image, a 3D image, a 4D image, or the like, or a combination thereof. For example, the image generation unit 510 may generate 3D image data or a 3D image corresponding to the 3D image data. The image generation unit 510 may generate or update the image data (or the image corresponding to the image data) based on one or more reconstruction operations. Exemplary reconstruction operations may include statistical reconstruction, filtered back projection (FBP), total variation (TV) based image reconstruction, iterative reconstruction, analytic reconstruction, or the like, or a combination thereof. In some embodiments, the image data or the image may be transmitted to the regularization unit 520 and/or the modification unit 530 for further processing, or transmitted to the storage unit 540 or any storage device disclosed elsewhere in the present disclosure for storage.

The regularization unit 520 may determine a regularization item and/or a regularization parameter. As used herein, the regularization item may refer to an item that may be used to regularize the image data during an image reconstruction process. For example, during an image reconstruction process, a surface of a tissue in the image may be smoothed based on the regularization item. In some embodiments, the regularization unit 520 may determine the regularization item based on a total variation (TV) of the image data. The regularization parameter may refer to a parameter that may be used to control the strength of the regularization item. In some embodiments, the regularization item and/or the regularization parameter may be provided as part of default settings of the CT system 100. For example, the regularization parameter may be a constant (e.g., an integer between 0 and 1). In some embodiments, the regularization item and/or the regularization parameter may be adjusted in different situations. Merely by way of example, a default value or a reference value of the regularization parameter may be provided by the processing engine 140, and adjusted based on a specific situation in which the regularization parameter is used. Description regarding the regularization item may be found in, for example, U.S. Pat. No. 10,559,079, entitled "SYSTEM AND METHOD FOR IMAGE RECONSTRUCTION," filed on even date, the contents of which are hereby incorporated by reference.

The modification unit 530 may modify the image or the image data based on the regularization item and/or the regularization parameter. The image or image data to be modified may be acquired from the image generation unit 510, the storage unit 540, or a storage device disclosed elsewhere in the present application. The modification unit 530 may modify the image data based on the regularization item and/or the regularization parameter. In some embodiments, the modification unit 530 may further provide a user interface (not shown). For instance, the user interface may be implanted on the terminal 130. A user (e.g., a doctor) may input one or more parameters to adjust the image or the image data via the user interface. For example, the user may enlarge or shrink the image. As another example, the user may modify a contrast of the image. As a further example, the user may initiate or terminate an image denoising operation.

The storage unit 540 may store the image or the image data, the regularization item, the regularization parameter, the modified image data, or the like. The storage format may include text, image, audio, video, code, or the like, or a combination thereof. In some embodiments, the image may be in a compressed format, such as Bitmap (BMP), Joint Photo Graphic Experts Group (JPEG), Tagged Image File Format (TIFF), Graphics Interchange Format (GIF), Portable Network Graphic (PNG), Exchangeable Image File (EXIF), etc. In some embodiments, the image may be stored in one or more other suitable manners. For example, the image may be stored in a format compatible with the digital imaging and communications in medicine (DICOM) protocol.

The storage unit 540 may refer to a system storage (e.g., a disk) that may be provided integrally (i.e., substantially non-removable), or a storage that may be connected to or communicate with the system via, for example, a port (e.g., a UBS port, a firewire port, etc.), a drive, etc. The storage unit 540 may include, for example, a hard disk, a floppy disk, a random access memory (RAM), a dynamic random access memory (DRAM), a static random access memory (SRAM), a bubble memory, a thin film memory, a magnetic plated wire memory, a phase change memory, a flash memory, or the like, or a combination thereof. The storage unit 540 may be connected to or communicate with one or more components of the processing engine 140. In some embodiments, the storage unit 540 may be operationally connected with one or more virtual storage resources (e.g., cloud storage, etc.) via the network.

It should be noted that the above description of the processing module is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more units in the processing module 440 may include an independent storage block (not shown) respectively. As another example, any two or more units may be combined as an independent unit used to implement more than one functions. As a further example, the storage unit 540 may be unnecessary and the processing module 440 may share the storage module 430 with the processing engine 140. As still a further example, any one of the units may be divided into two or more sub-units.

Figure 6:
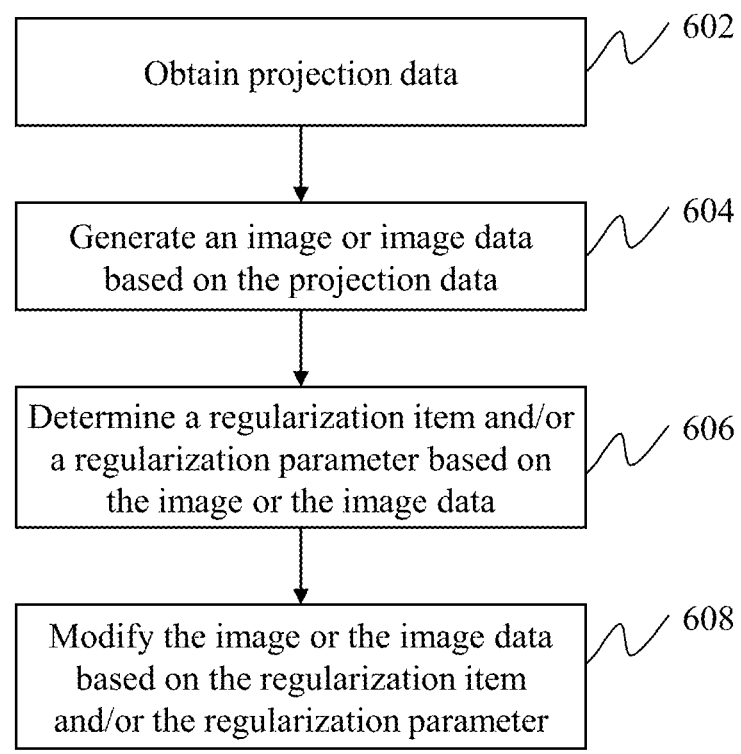
FIG. 6 is a flowchart illustrating an exemplary process for processing image or image data according to some embodiments of the present disclosure.

FIG. 6 is a flowchart illustrating an exemplary process 600 for processing image or image data according to some embodiments of the present disclosure.

In 602, projection data may be obtained. The projection data may be obtained by the image generation unit 510. As used herein, the projection data may refer to two-dimensional data corresponding to an image or image data that is projected onto a specific projection plane. For example, the projection data may be determined based on a projection matrix. The projection matrix may be part of default settings of the processing engine 140, or may be adjusted by a user (e.g., a doctor). In some embodiments, the projection data may be determined based on the CT data acquired by the acquisition module 410. The projection data determined based on the CT data may also be referred to as original projection data. The original projection data may indicate the attenuation occurred when radioactive rays pass through the imaged subject. In some embodiments, the original projection data may be obtained by performing multiple projections at different angles around the imaged subject. For example, the original projection data may be obtained by performing projections at sparse angles to reduce the radiation dose.

In some embodiments, the projection data may include sparse projection data, limited-range projection data, low-dose projection data, local projection data, incomplete projection data, or the like, or any combination thereof. For example, low-dose projection data may be obtained from the CT scanner 110 (e.g., the detector 112) during a CT scanning with a reduced radiation dose. In some embodiments, the projection data may be processed. For example, the projection data may be filtered according to a Gaussian approach in order to remove or reduce noise in the projection data.

In 604, an image or image data may be generated based on the projection data. The image or the image data may be generated by, for example, the image generation unit 510. The image or the image data may be generated according to one or more reconstruction operations. Exemplary reconstruction operations may include a statistical reconstruction, FBP, an iterative reconstruction, an analytic reconstruction, a TV based reconstruction, or the like, or any combination thereof. In some embodiments, original image data or an original image may be generated based on the original projection data. In some embodiments, the original image data or the original image may be determined based on default settings of the processing engine 140. For example, the original image data or the original image may be an image of which voxel values or pixel values (e.g., grey values) are all zeros. As another example, the original image data or the original image may be a CT image relating to a mold (e.g., a liver mold). In some embodiments, the original image data or the original image may be provided by a user (e.g., a doctor).

In some embodiments, 2D image data or a 2D image corresponding to the 2D image data may be generated. In some embodiments, 3D image data or a 3D image corresponding to the 3D image data may be generated. The image or the image data may include a plurality of elements (e.g., pixels for 2D image data or 2D image, voxels for 3D image data or 3D image). In some embodiments, each of the plurality of elements may correspond to an element value.

As used herein, the element value may include red, green and blue (RGB) value, grey value, or the like, or a combination thereof. In some embodiments, a plurality of element values corresponding to the plurality of elements may be recorded in a matrix.

In 606, a regularization item and/or a regularization parameter may be determined based on the image or the image data. As used herein, the regularization item may refer to an item that may be used to regularize the original image data during an image reconstruction process. The regularization parameter may refer to a parameter that may be used to control the strength of the regularization item. The regularization item and/or the regularization parameter may be determined by the regularization unit 520. In some embodiments, the regularization item may be part of default settings of the processing engine 140.

In some embodiments, the regularization parameter may be determined based on a regularization algorithm. The regularization algorithm may be an equation, a constraint condition, or the like, or any combination thereof. The regularization algorithm may relate to the element values of the elements in the image data, the gradient of the image data, the noise(s) in the image data, etc. In some embodiments, the regularization algorithm may be adaptively adjusted in accordance with the gradient of the image data. For example, the regularization algorithm may be adjusted to increase the regularization parameter if the gradient exceeds a threshold. The gradient that exceeds the threshold may indicate an edge or a boundary in the image. In some embodiments, the regularization algorithm may be adaptively adjusted in accordance with a restriction (e.g., a first derivative of the regularization item) of the image data. As used herein, the restriction may represent a constraint for the roughness of the surface of an organ or a tissue in the image data. For example, the regularization algorithm may be adjusted to increase the regularization parameter if the restriction is found to be low (e.g., is within a range, see FIG. 8A and the description thereof).

In some embodiments, the regularization parameter may include a plurality of parameter values. Each of the plurality of parameter values may correspond to an element in the image or image data. For example, for a 2D image including 9×9 pixels, the regularization parameter may include 81 parameter values. Each of the 81 parameter values may correspond to a pixel of the 2D image. The regularization parameter including a plurality of parameter values may be expressed in the form of a matrix.

In 608, the image or the image data may be modified based on the regularization item and/or the regularization parameter. The image or the image data may be modified by, for example, the modification unit 530. The original image or image data may be modified based on the regularization item and/or the regularization parameter to provide the modified image data.

In some embodiments, the process 600 may be an iterative process or a cyclic process including a plurality of iterations. During each of the plurality of iterations, the regularization parameter and/or the regularization item may be updated based on the modified image data obtained from a prior iteration. The updated regularization parameter and/or the updated regularization item may be used to modify the image data in the current iteration. In some embodiments, the iteration may terminate when a termination condition is satisfied. For instance, the termination condition may be that the difference between image data obtained in two successive iterations is smaller than a threshold.

After the iterative process or the cyclic process terminates, regularized image or image data may be obtained based on the regularization item and/or the regularization parameter. In some embodiments, the regularized image or image data may be determined according to Equation (1):

$$I^* = \underset{I}{\mathrm{argmin}}[\|FP(I) - Y\| + \beta R(I)], \tag{1}$$

where $I^*$ may denote the regularized image or image data, I may denote intermediate image data or an intermediate image, FP may denote the forward projection operator (accordingly, FP(I) may denote intermediate projection data corresponding to the intermediate image data or the intermediate image), Y may denote the original projection data, R(I) may denote the regularization item, and β may denote the regularization parameter. Merely by way of example, in a TV based image reconstruction, R(I) may be the total variation of the image data I.

In some embodiments, the regularized image data $I^*$ (i.e., the solution of the Equation (1)) may be determined in an iterative form according to Equation (2):

$$I^k = I^{k-1} - \frac{BP(W \cdot (FP(I^{k-1}) - Y)) + \beta \dot{R}(I^{k-1})}{BP(W \cdot FP(I)) - \beta \ddot{R}(I^{k-1})}, \tag{2}$$

where $I^k$ may denote the intermediate image data obtained in the k-th iteration, BP may denote the back projection operator, W may denote the a statistical weight (e.g., a constant), $\dot{R}$ may denote the first derivative of the regularization item, and $\ddot{R}$ may denote the second derivative of the regularization item.

In some embodiments, a determination as to whether a preset condition is satisfied may be made. If the preset condition is satisfied, the iterative process or the cyclic process may terminate and the regularized image or image data may be obtained. If the preset condition is not satisfied, another round of iteration may be performed within which operation 606 through 608 may be repeated to determine a new regularization parameter based on the restriction and/or the gradient of the image data, and the image data may be modified based on the new regularization parameter.

In some embodiments, the preset condition may be a number threshold (e.g., 20 times) associated with the iterative process. In this situation, when the number of iterations reaches the number threshold, the iterative process may terminate. The number threshold may be part of default settings of the processing engine 140 or may be adjusted by a user (e.g., a doctor) under different situations.

In some embodiments, the preset condition may be a difference threshold associated with a difference among a plurality of (e.g., two or more) images or a plurality sets of (e.g., two or more) image data obtained in a plurality of (e.g., two or more) successive iterations. For example, the iterative process may terminate when the difference between the k-th image data $I^k$ and the (k−1)-th image data $I^{k-1}$ is smaller than the difference threshold. As used herein, the k-th image data $I^k$ may refer to the image data obtained in the k-th iteration, and the (k−1)-th image data $I^{k-1}$ may refer to the image data obtained in the (k−1)-th iteration. The difference threshold may be part of default settings of the processing engine 140, or may be adjusted by a user (e.g., a doctor) under different situations.

When the preset condition is satisfied, the regularized image or image data may be determined. In some embodiments, the image or image data obtained from the last iteration may be provided as the regularized image or image data. In some embodiments, the regularized image or image data may be further processed. For example, the regularized image data may be processed by performing an image enhancement operation, such as grey-level histogram enhancement.

It should be noted that the above description is provided for the purposes of illustration, not intended to limit the scope of the present disclosure. For persons having ordinary skills in the art, multiple variations and modifications may be reduced to practice in the light of the present disclosure. For example, the process 600 may further include an operation for determining intermediate projection data based on the intermediate image or the intermediate image data obtained in 604. The intermediate projection data may be determined after the regularization item and/or the regularization parameter are determined in 606. As another example, the process 600 may further include storing the regularized image or image data in a storage device, for example, the storage unit 540. However, those variations and modifications do not depart from the scope of the present disclosure.

Figure 7:
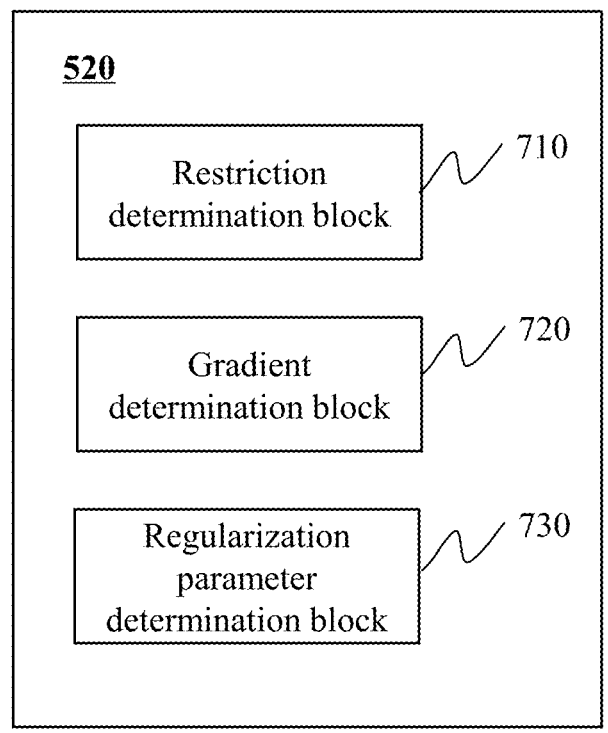
FIG. 7 is a block diagram illustrating an exemplary regularization unit according to some embodiments of the present disclosure.

FIG. 7 is a block diagram illustrating an exemplary regularization unit 520 according to some embodiments of the present disclosure. The regularization unit 520 may include a restriction determination block 710, a gradient determination block 720, and a regularization parameter determination block 730.

The restriction determination block 710 may determine a restriction that may represent a constraint for the roughness on the surface of an organ or a tissue in the image data. In some embodiments, the restriction may be determined based on the regularization item. For example, the restriction may be determined based on the first derivative of the regularization item. In some embodiments, the regularization item may include a plurality of item elements corresponding to the plurality of elements of the image data. Accordingly, the restriction may include a plurality of restriction elements corresponding to the plurality of elements in the image data. The restriction including a plurality of restriction elements may be determined based on the regularization item.

The gradient determination block 720 may determine a gradient of the image data. As used herein, the gradient of the image data may refer to a gradient of element values of the image data along a specific direction. The gradient may include a plurality of gradient values corresponding to the plurality of elements in the image data.

The regularization parameter determination block 730 may determine a regularization parameter. As described in connection with 606, the regularization parameter may refer to a parameter that may be used to control the strength of the regularization item. In some embodiments, the regularization parameter may be a coefficient of the regularization item (e.g., a positive integer, a decimal between 0 and 1, etc.). The regularization parameter may be a constant, or a variable with respect to different elements of the image or image data. In some embodiments, the regularization parameter may be set by a user (e.g., an imaging technician) via an interface in the processing engine 140, or set according to a default setting of the processing engine 140, etc. For example, a user may determine the regularization parameter based on the surface of an organ of interest.

In some embodiments, the regularization parameter may be determined based on a regularization algorithm. In some embodiments, the regularization algorithm may relate to the gradient of the image data and/or the restriction (e.g., the first derivate of the regularization item) of the image data.

In some embodiments, the regularization parameter may include a plurality of parameter values. Each of the plurality of parameter values may correspond to an element in the image or image data (e.g., a pixel in a 2D image, a voxel in a 3D image, etc.). In some embodiments, the regularization parameter including a plurality of parameter values may be expressed in the form of a matrix.

It should be noted that the above description is provided for the purposes of illustration, not intended to limit the scope of the present disclosure. For persons having ordinary skills in the art, multiple variations and modifications may be reduced to practice in the light of the present disclosure. However, those variations and modifications do not depart from the scope of the present disclosure. For example, the regularization unit 520 may further include a regularization item block (not shown) that may be used to determine a regularization item of the image data. As another example, in a process of reconstructing an image based on an iterative reconstruction algorithm, the regularization parameter for an m-th iteration may be different from that for an n-th iteration.

Figure 8A:
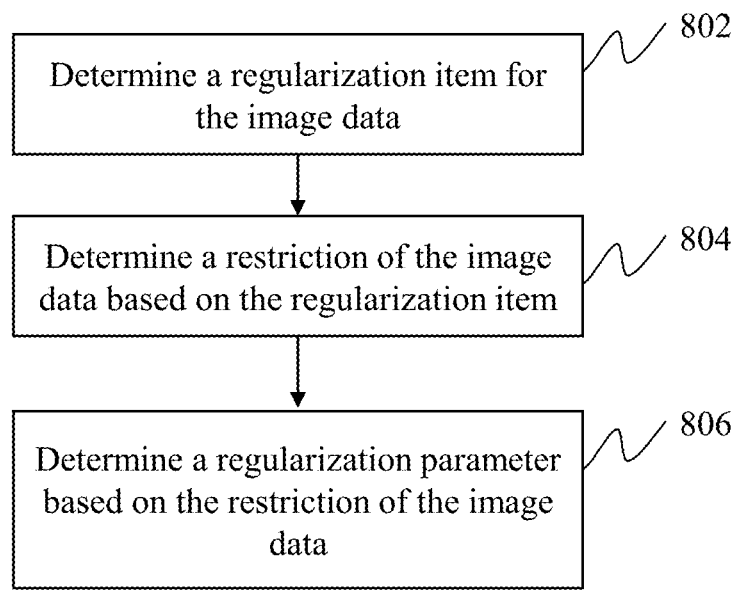
FIG. 8A through FIG. 8C depict flowcharts illustrating exemplary processes for determining a regularization parameter according to some embodiments of the present disclosure.

FIG. 8A is a flowchart illustrating an exemplary process 800 for determining a regularization parameter according to some embodiments of the present disclosure.

In 802, a regularization item of the image data may be determined. The regularization item may be determined by the regularization item block (not shown). In some embodiments, the regularization item may be determined based at least partially on a feature (e.g., grey value, RGB value, etc.) of the elements in the image data. In some embodiments, the regularization item may be determined based at least partially on a feature (e.g., roughness, non-uniformity, shape, etc.) of the image data. In some embodiments, for a specific iteration as described in 608, the regularization item may be determined based on the image data obtained in the prior iteration.

In some embodiments, the regularization item may be set by a user (e.g., a doctor), set according to the default setting of the processing engine 140, etc. In some embodiments, the regularization item may include a plurality of item elements corresponding to the plurality of elements of the image data. For example, the regularization item may be expressed as a matrix including a plurality of item elements, and each of the plurality of item elements corresponds to an element of the image data.

In 804, a restriction of the image data may be determined based on the regularization item. The restriction of the image data may be determined by the restriction determination block 710. As used herein, the restriction may represent a constraint for the roughness of the surface of an organ or a tissue in the image data. For example, the restriction may be determined based on the first derivative of the regularization item. In some embodiments, before a specific iteration is started, the first derivative of the regularization item may be determined based on the image data obtained in the prior iteration. For example, before the k-th iteration is started, the first derivative of the regularization item may be determined based on the image data obtained in the (k−1)-th iteration.

In some embodiments, the restriction may include a plurality of restriction elements corresponding to the plurality of elements of the image data. For example, the restriction may be expressed as a matrix including a plurality of restriction elements, and each of the plurality of restriction elements corresponds to an element of the image data.

In some embodiments, a plurality of absolute values of the plurality of restriction elements corresponding to the plurality of elements in the image data may be determined.

In 806, a regularization parameter may be determined based on the restriction (e.g., the first derivative of the regularization item) of the image data. The regularization parameter may be determined by the regularization parameter determination block 730. In some embodiments, the regularization parameter may include a plurality of parameter values corresponding to the plurality of elements of the image data. For example, as described in connection with 802 and 804, the regularization parameter may be expressed as a matrix including a plurality of parameter values, and each of the plurality of parameter values corresponds to an element of the image data.

In some embodiments, a determination may be made as to whether the plurality of elements in the image data satisfy a preset condition. In some embodiments, a determination for each of the plurality of elements may be made. For a specific element, if the preset condition is satisfied, a specific parameter value corresponding to the specific element may be changed (e.g., be boosted); if the preset condition is not satisfied, the specific parameter value corresponding to the specific element may remain unchanged.

Merely by way of example, the preset condition may include a range (e.g., a range between a positive number a and a positive number b, and a>b). The range may be provided for smoothing the transition between an element whose parameter value is changed and an element whose parameter value remains unchanged. When the absolute value of the restriction element (e.g., an absolute value of the first derivative of the regularization item corresponding to a specific element) corresponding to a specific element is within the range, the parameter value corresponding to the specific element may be boosted.

In some embodiments, the parameter value corresponding to a specific element that satisfies the preset condition may be boosted according to Equation (6):

$$\beta_k = \beta_{k-1} \cdot \left( (c-1) \cdot \cos^2\left( \frac{\pi}{2} \cdot \frac{a - |\dot{R}(I)|}{a - b} \right) + 1 \right), \quad (6)$$

where $\beta_k$ may denote the parameter value corresponding to the specific element to be determined in the k-th iteration, $\beta_{k-1}$ may denote the parameter value corresponding to the specific element in the preceding iteration, c may be a constant (e.g., an empirical value) for regulating or adjusting the strength of the restriction that represents a constraint for the roughness on the surface of an organ or a tissue in the image data, and $\dot{R}(I)$ may denote the first derivative of the regularization item (herein for the specific element, $\dot{R}(I)$ may denote a value of the first derivative of the regularization item at the specific element). In some embodiments, c may be a positive number larger than 1 (e.g., 2). In some embodiments, the values of c in at least two rounds of iterations may be different. In some embodiments, the parameter values for the elements that satisfy the preset condition may be boosted according to Equation (6), and the parameter values for other elements may remain unchanged.

Figure 8B:
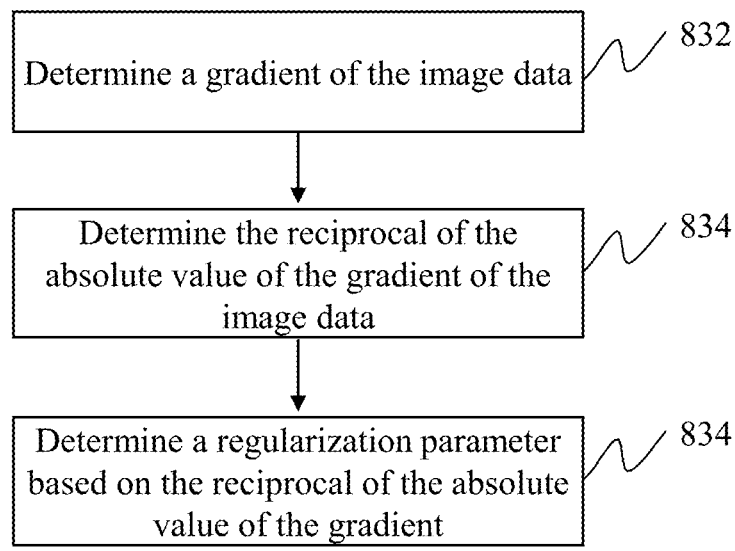

FIG. 8B is a flowchart illustrating an exemplary process 830 for determining a regularization parameter according to some embodiments of the present disclosure.

In 832, a gradient of the image data may be determined. The gradient of the image data may be determined by, for example, the gradient determination block 720. In some embodiments, the gradient may be determined based at least partially on a feature (e.g., grey value, RGB value, etc.) of the elements in the image data In some embodiments, the gradient of the original image data may be expressed as Equation (7) below:

$$G_O = \nabla I^O, \quad (7)$$

where $G_O$ may denote the gradient of the original image data and $I^O$ may represent the original image data.

In some embodiments, the gradient may include a plurality of gradient values corresponding to the plurality of elements of the image data. For example, the gradient may be expressed as a matrix including a plurality of gradient values, and each of the plurality of gradient values corresponds to an element of the image data.

In 834, the reciprocal of the absolute value of the gradient of the original image data may be determined. In some embodiments, the reciprocal of the absolute value of the gradient of the original image data may be determined by the gradient determination block 720. The reciprocal of the absolute value of the gradient may be expressed as Equation (8) below:

$$R_G = 1/|\nabla I^O|, \quad (8)$$

where $R_G$ may denote the reciprocal of the gradient.

In some embodiments, as described above, the reciprocal of the gradient may include a plurality of reciprocal values corresponding to the plurality of elements of the image data. For example, the reciprocal of the gradient may be expressed as a matrix including a plurality of reciprocal values, and each of the plurality of reciprocal values corresponds to an element of the image data. The plurality of reciprocal values may be determined according to Equation (8) in connection with Equation (3), Equation (4), and Equation (5).

In 836, a regularization parameter may be determined based on the reciprocal of the absolute value of the gradient. The regularization parameter may be determined by the regularization parameter determination block 730. In some embodiments, as described in connection with 806, the regularization parameter may include a plurality of parameter values corresponding to the plurality of elements of the image data. For example, the regularization parameter may be expressed as a matrix including a plurality of parameter values, and each of the plurality of parameter values corresponds to an element of the image data.

In some embodiments, a determination may be made as to whether the plurality of elements in the image data satisfy a preset condition. In some embodiments, a determination for each of the plurality of elements may be made. For a specific element, if the preset condition is satisfied, the specific parameter value corresponding to the specific element may be changed (e.g., be boosted); if the preset condition is not satisfied, the specific parameter value corresponding to the specific element may remain unchanged.

Merely by way of example, the preset condition may include a range (e.g., a range between a positive number a and a positive number b, and a>b). The range may be provided for smoothing the transition between an element whose parameter value is changed and an element whose parameter value remains unchanged. When the absolute value of the reciprocal value corresponding to the specific element is within the range, the parameter value corresponding to the specific element may be boosted. In some embodiments, a and b may be constants, or variables which may be different in at least two round of iterations. The range may be part of default settings of the processing engine 140 or may be adjusted in different situations by a user (e.g., a doctor). The elements that satisfy the preset condition may indicate the surface of an organ or boundaries between different tissues.

In some embodiments, the parameter value corresponding to a specific element that satisfies the preset condition may be determined according to Equation (9):

$$\beta_k = \beta_0 \left( (c-1) \cdot \cos^2\left(\frac{\pi}{2} \cdot \frac{a^{-1}/|\nabla I^0|}{a-b}\right) + 1 \right), \quad (9)$$

where $\beta_k$ may denote the parameter value corresponding to the specific element to be determined in the k-th iteration, $\beta_0$ may denote the parameter value corresponding to the specific element determined by a user prior to the iterations, $\nabla I^0$ may denote the gradient of the original image data (herein for the specific element, $\nabla I^0$ may denote a gradient value at the specific element), and c may be a constant. c may be provided for regulating or adjusting the strength of the restriction that represents a constraint for the roughness on the surface of an organ or a tissue in the image data. In some embodiments, c may be a positive number larger than 1 (e.g., 2). In some embodiments, the values of c in at least two rounds of iterations may be different. In some embodiments, the parameter values for the elements that satisfy the preset condition may be boosted according to Equation (9), and the parameter values for other elements may remain unchanged.

Figure 8C:
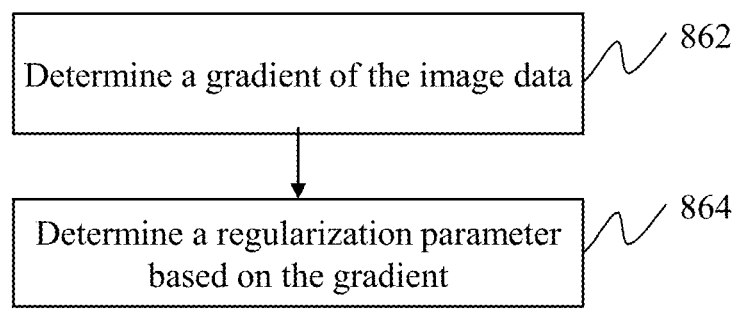

FIG. 8C is a flowchart illustrating an exemplary process 860 for determining a regularization parameter according to some embodiments of the present disclosure.

In 862, a gradient of the image data may be determined. The gradient of the image data may be determined by, for example, the gradient determination block 720. In some embodiments, the gradient may be determined based at least partially on a feature (e.g., grey value, RGB value, etc.) of the elements in the image data In some embodiments, the gradient of the original image data may be determined according to Equation (7) above.

In 864, a regularization parameter may be determined based on the gradient of the original image data. The regularization parameter may be determined by the regularization parameter determination block 730. In some embodiments, as described in connection with 806 and 836, the regularization parameter may include a plurality of parameter values corresponding to the plurality of elements of the image data. For example, the regularization parameter may be expressed as a matrix including a plurality of parameter values, and each of the plurality of parameter values corresponds to an element of the image data. The regularization parameter may be determined according to the Equation (10):

$$\beta_k = \beta_0 \cdot d \cdot |\nabla I^0|, \quad (10)$$

where $\beta_k$ may denote the regularization strength of the image data obtained in the k-th iteration; with respect to a specific element, $\beta_0$ may denote the parameter value corresponding to the specific element determined by, for example, a user prior to the iterations, and d may be a scalar value for a voxel in the 3D image data. In some embodiments, d may take different values with respect to the voxels across that volume. The 3D image data may be expressed in the form of a 3D data matrix. The size of the 3D data matrix may be the same with that of the matrix of the regularization parameter.

It should be noted that the above description is provided for the purposes of illustration, not intended to limit the scope of the present disclosure. For persons having ordinary skills in the art, multiple variations and modifications may be reduced to practice in the light of the present disclosure. For example, the gradient of the image data may be expressed as a function relating to the image data. For a specific element of the image data, a gradient value corresponding to the element may be determined based on the function. In some embodiments, similar alternations or modifications may be made in the expression(s) of the reciprocal of the gradient, the restriction, the regularization parameter and/or the regularization item. However, those variations and modifications do not depart from the scope of the present disclosure.

EXAMPLES

The following examples are provided for illustration purposes, and not intended to limit the scope of the present disclosure.

Figure 9A:
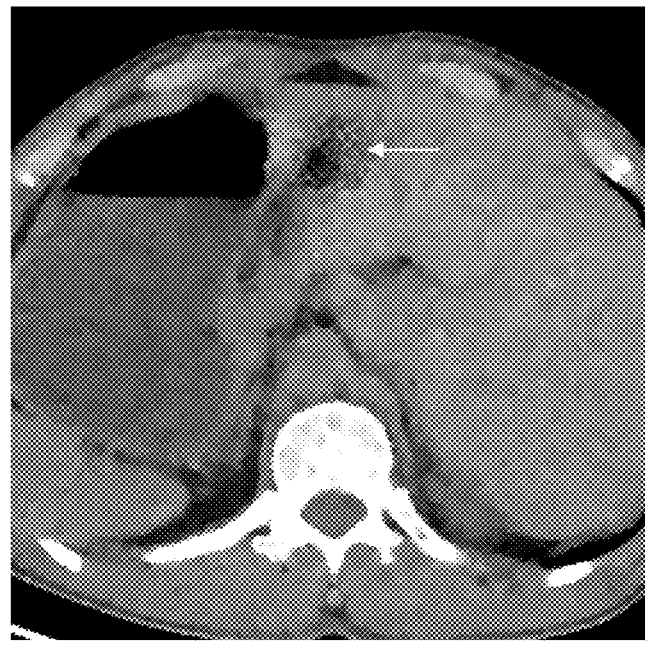
FIG. 9A is an exemplary CT image reconstructed by performing an edge preserving regularization according to some embodiments of the present disclosure.

FIG. 9A is an exemplary CT image reconstructed by performing edge preserving regularization according to some embodiments of the present disclosure. The CT image was reconstructed based on a statistical reconstruction technique, and an edge preserving regularization was performed after reconstruction. The edge preserving regularization increased noise on the edges (e.g., the inner surface of an organ pointed by the arrow) that appear rough.

Figure 9B:
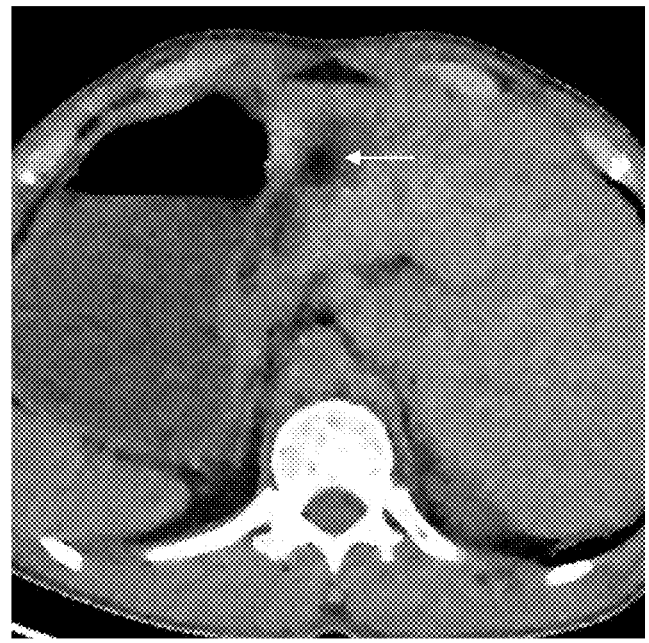
FIG. 9B is an exemplary CT image reconstructed by performing a regularization based on the regularization parameter according to some embodiments of the present disclosure.

FIG. 9B is an exemplary CT image reconstructed by performing a regularization based on the regularization parameter according to some embodiments of the present disclosure. The image illustrated in FIG. 9B was generated by performing a regularization operation on the image as illustrated in FIG. 9A. The regularization operation was performed based on the regularization parameter determined, for example, according to Equation (6), Equation (9), or Equation (10). The edges pointed by the arrow in FIG. 9B appear to be smoother than those in FIG. 9A.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system comprising:
a processor; and
storage configured to store instructions, the instructions, when executed by the processor, cause the processor to perform operations including;
obtaining image data corresponding to one or ore pixels or voxels;
determining a regularization item that regularizes the image data;
determining an assessment parameter of the image data, wherein the assessment parameter includes a restriction or a gradient of the image data, the assessment parameter including one or more assessment elements each of which corresponds to one of the one or more pixels or voxels;

determining a regularization parameter for the image data by a process, wherein the regularization parameter relates to strength of the regularization item, the process including:
  for each of the one or more pixels or voxels and a corresponding parameter value of the each of the one or more pixels or voxels,
    obtaining a corresponding assessment element of the each of the one or more pixels or voxels;
    boosting the parameter value if the assessment element is in a range; and
    maintaining the parameter value if the assessment element is outside the range; and
  generating a regularized image based on the regularization parameter and the regularization item.

2. The system of claim 1, the obtaining image data corresponding to one or more pixels of voxels comprising:
  reconstructing original projection data based on a statistical reconstruction algorithm with edge preserving regularization.

3. The system of claim 1, wherein the restriction of the image data is determined based on a first derivative of the regularization item.

4. The system of claim 1, wherein the regularization item is a matrix including one or more item elements each of which corresponds to one of the one or more pixels or voxels of the image data.

5. The system of claim 1, wherein the gradient of the image data is determined based on grey values of the image data.

6. The system of claim 1, wherein the gradient is a matrix including one or more gradient values.

7. A method implemented on at least one device each of which has at least one processor and storage, the method comprising:
  obtaining image data corresponding to one or more pixels or voxels;
  determining a regularization item that regularizes the image data;
  determining an assessment parameter of the image data, wherein the assessment parameter include a restriction or a gradient of the image data, the assessment parameter including one or more assessment elements each of which corresponds to one of the one or more pixels or voxels;
  determining a regularization parameter for the image data by a process, wherein the regularization parameter relates to strength of the regularization item, the process including: for each of the one or more pixels or voxels and a corresponding parameter value of the each of the one or more pixels or voxels,
    obtaining a corresponding assessment element of the each of the one or more pixels or voxels;
    boosting the parameter value if the assessment element is within a range; and
    maintaining the parameter value if the assessment element is outside the range; and
  generating a regularized image based on the regularization parameter and the regularization item.

8. The method of claim 7, the obtaining image data corresponding to one or more pixels of voxels comprising:
  reconstructing original projection data based on a statistical reconstruction technique with edge preserving regularization.

9. The method of claim 7, wherein the restriction of the image data is determined based on a first derivative of the regularization item.

10. The method of claim 7, wherein the regularization item is a matrix including one or more item elements each of which corresponds to one of the one or more pixels or voxels of the image data.

11. The method of claim 7, wherein the gradient of the image data is determined based on grey values of the image data.

12. The method of claim 7, wherein the gradient is a matrix including one or more gradient values.

13. The method of claim 7, the determining the regularization parameter for the image data further comprising:
  regularizing the image data in a plurality of iterations, and
  during each of the plurality of iterations, determining the restriction or the gradient of image data generated in a prior iteration; and
  updating the regularization parameter based on the restriction or the gradient.

14. A system comprising:
  at least one storage medium including a set of instructions for processing a projection image;
  an image generation module configured to obtain image data corresponding to one or more pixels or voxels;
  at least one processor in communication with the at least one storage medium, wherein when executing the set of instructions, the at least one processor is configured to cause the system to:
  determine a regularization item that regularizes the image data;
  determine an assessment parameter of the image data, wherein the assessment parameter includes a restriction or a gradient of the image data, the assessment parameter including one or more assessment elements each of which corresponds to one of the one or more pixels or voxels;
  determine a regularization parameter for the image data by a process, wherein the regularization parameter relates to strength of the regularization item, the process including:
  for each of the one or more pixels or voxels and a corresponding parameter value of the each of the one or more pixels or voxels,
    obtain a corresponding assessment element of the each of the one or more pixels or voxels;
    boost the parameter value if the assessment element is within a range; and
    maintain the parameter value if the assessment element is outside the range; and
  generate a regularized image based on the regularization parameter and the regularization item.

15. The system of claim 14, wherein the image generation module is further configured to:
  reconstruct original projection data based on a statistical reconstruction algorithm with edge preserving regularization.

16. The system of claim 14, wherein the restriction of the image data is determined based on a first derivative of the regularization item.

17. The system of claim 14, wherein the regularization item is a matrix including one or more item elements each of which corresponds to one of the one or more pixels or voxels of the image data.

18. The system of claim 14, wherein the gradient of the image data is determined based on grey values of the image data.

19. The system of claim 14, wherein the gradient is a matrix including one or more gradient values.

20. The system of claim 14, wherein the image generation module is further configured to:
  regularize the image data in a plurality of iterations, and during each of the plurality of iterations, determine the restriction or the gradient of image data generated in a prior iteration; and
  update the regularization parameter based on the restriction or the gradient.

* * * * *